April 27, 1954        B. J. LAZAN        2,676,486
FATIGUE TESTING MACHINE
Filed Feb. 14, 1951        2 Sheets-Sheet 2
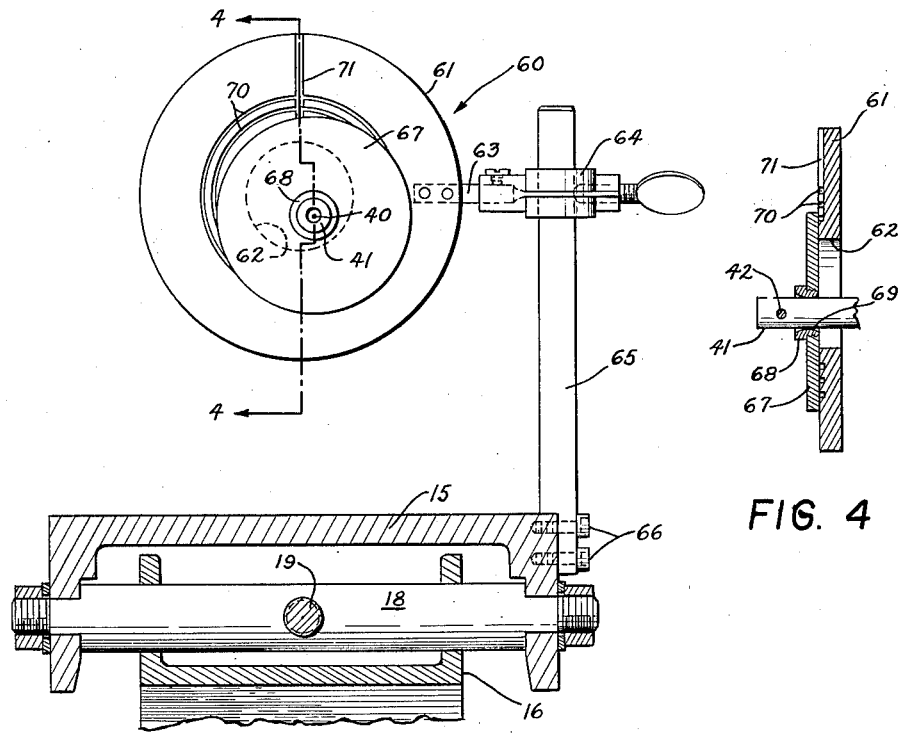
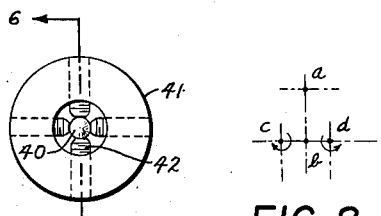
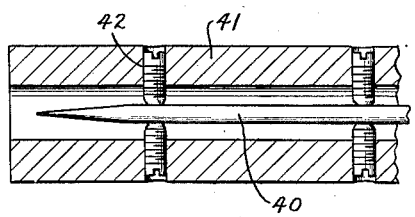
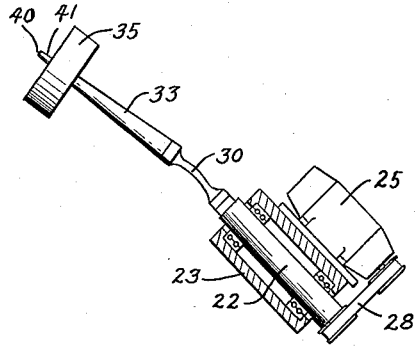
INVENTOR.
BENJAMIN J. LAZAN
BY
ATTORNEYS Patented Apr. 27, 1954

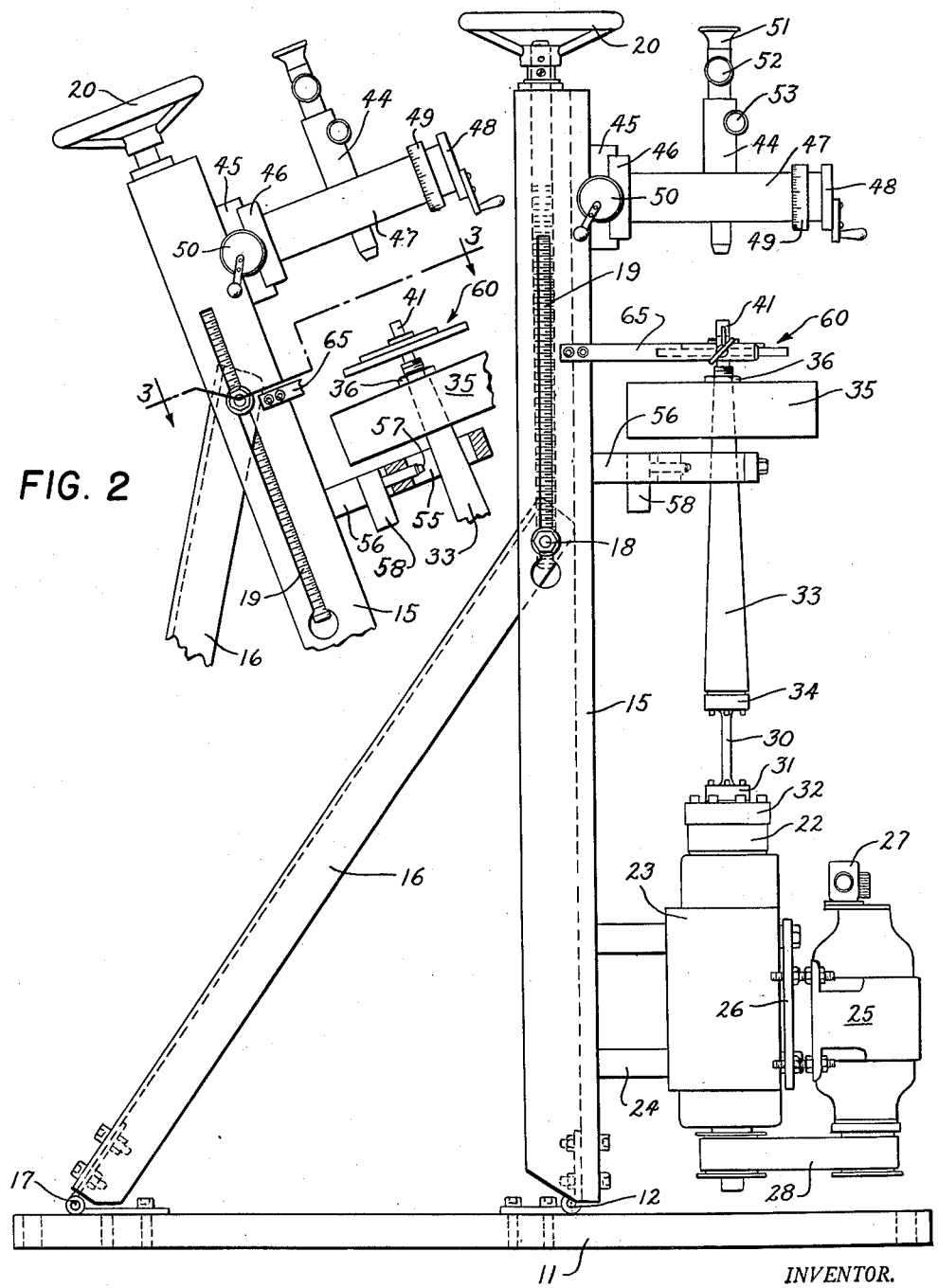

2,676,486

UNITED STATES PATENT OFFICE 2,676,486

FATIGUE TESTING MACHINE

Benjamin J. Lazan, Minneapolis, Minn., assignor to the United States of America as represented by the Secretary of the Navy Application February 14, 1951, Serial No. 210,853

15 Claims. (Cl. 73—100)

The invention described herein may be manufactured and used by or for the Government of the United States of America for governmental purposes without the payment of any royalties thereon or therefor.

The present invention pertains to the art of testing materials, and it is embodied in a machine for determining damping capacity, dynamic modulus of elasticity and fatigue properties of materials.

Apparatus of the present invention operates to apply flexure stress to an elongated specimen of the material, flexure stresses being repeated at predetermined time intervals and as often as is required for a given test. Repeated flexure stresses are applied by rotating the specimen on its lengthwise axis.

The specimen is provided with a contour which is symmetrical around its lengthwise axis, i. e., centers of gravity of increment transverse cross-sections lie in a straight line coincident with the geometrical longitudinal axis of the specimen. The simplest form of specimen is cylindrical with the axis of the cylinder being coincident with the lengthwise center-line of mass. The specimen of the disclosure, as it is actually used in practice of the invention, is similar to the conventional test specimen for tensile tests.

The specimen is bent and held in bent condition so that the axis of the specimen is deflected away from the axis of the cylinder. By rotating the bent specimen on its axis, it is repeatedly flexed diametrically, the resultant repeated flexure stresses being applied on successive radii circumferentially. Successive flexure stresses are applied progressively around the specimen reversely of its direction of rotation.

Apparatus of the invention is embodied in a machine which comprises a rotatable spindle. The specimen is secured at its one end to the spindle coaxially therewith. At its other end, the specimen is secured to a coaxial shaft, the free end of which remote from the specimen is held displaced in a static direction away from the axis of the spindle extended.

The free end of the shaft preferably is displaced out of line with the axis of the spindle by a weight, which is attached to the shaft a predetermined distance along its length away from the end of the specimen. The weight applies a cantilever load that bends the specimen. The spindle, and also the shaft that carries the weight, are constructed strong enough to not bend appreciably under the load of the weight, and bending is therefore confined to the specimen.

The spindle is carried by an adjustable mount to vary the angle of inclination of the axis of the spindle. The horizontal moment arm of the weight is thereby varied to adjust the cantilever load on the specimen and thus vary the magnitude of flexure of the specimen accordingly.

Curvature of the axis of the specimen cylinder is a measure of the magnitude of flexure of the specimen, and the measurement is made by measuring the displacement of the free end of the shaft. A central target at the free end of the shaft is observed through a microscope which is mounted to view the target endwise of the specimen. The microscope mount includes a traverse in the direction of the ordinate corresponding with the specimen being bent by dead-weight. An additional traverse of the microscope in the lateral or transverse direction of the abscissa determines lateral or transverse displacement of the target due to rotation of the specimen on its axis.

A vibration damper is provided to steady the position of the target, and thereby enables its displacement to be read more easily and accurately. The vibration damper comprises a pair of plates bearing against each other face-to-face, and a film of oil between the plates reduces friction to hold the error by friction of target displacement negligibly low. Therefore, any error of target displacement reading that is caused by friction drag is so low that it does not affect the accuracy of test findings.

For a fuller understanding of the principles of the invention, and for details of one practical embodiment thereof, attention is directed to the accompanying drawings. In the drawings—

Fig. 1 is a side elevation of a machine embodying the invention,

Fig. 2 is a fragmentary side elevation, partially in cross-section, of certain components of the machine of Fig. 1, illustrating a second position of machine operation, Fig. 3 is a cross-sectional plan, taken on line 3—3 of Fig. 2, Fig. 4 is a cross-sectional elevation, taken on line 4—4 of Fig. 3, Fig. 5 is a detailed end view of the target as viewed from the position of the microscope, Fig. 6 is a fragmentary cross-sectional elevation, taken on line 6—6 of Fig. 5, Fig. 7 is a schematic side elevation, illustrating principles of operation of the invention, and Fig. 8 is a diagrammatic view, illustrating measurements that are taken to determine properties of materials by means of the machine of Fig. 1.

The machine of the disclosure comprises a rigid foundation or base 11, Fig. 1, which preferably is disposed horizontally, and which embodies the horizontal pivot 12.

An upright table or platen 15 is supported by the base 11 to swing on the pivot 12. The brace 16 also swings on a horizontal pivot 17 of the base 11, pivots 12 and 17 being parallel. The pivot 17 is a connection between the base 11 and the brace 16 at its one end, and a similar pivotal connection 18 between the platen 15 and the brace 16 at its other end is parallel with pivots 17 and 12.

The described structure enables the platen 15 to be positioned at various angles of inclination with reference to horizontal, and traversing mechanism is provided to adjust the position of inclination of the platen 15. The traversing mechanism comprises the lead or traverse screw 19 carried by the platen 15 and directed lengthwise thereof at right angles to the pivot 12. Traverse screw 19 is threaded through the shank of pivot 18 transversely of its axis as seen in Fig. 3, and the pivot 18 therefore constitutes a traversing carriage or nut that travels along screw 19. The handle or hand wheel 20 serves for manual rotation of traverse screw 19 to drive the nut 18 and thereby adjust the platen 15 to the desired angle of inclination.

The spindle 22 is rotatable in the journal 23, which is secured to the platen 15 by means of the brackets 24 that hold the axis of the spindle parallel to the platen 15. In the position illustrated in Fig. 1, the axis of the spindle 22 is vertical. Rotation of the hand wheel 20 to traverse the nut 18 upwardly along the screw 19 causes the axis of spindle 22 to tilt with base 15 out of vertical position shown in Fig. 1, and into an inclined position, for example, into the position illustrated in Fig. 2.

The motor 25 is mounted on the journal 23 by means of support brackets 26, and includes any suitable revolution counter 27. The spindle 22 is driven from the motor 25 by means of the belt 28.

The specimen 30 is an elongated piece of the material to be tested and is contoured symmetrically around its longitudinal axis. In the disclosure, and in accordance with common and preferred practice, the specimen is similar to conventional tensile-test specimens and comprises a cylinder of predetermined length. At its one end, the specimen 30 is secured to the adaptor 31 which fits the attachment 32 at the end of spindle 22, and by means of which the specimen 30 is secured at its one end to the spindle 22 coaxially therewith.

The shaft 33 is secured to the other end of the specimen 30 coaxially therewith by means of the adaptor 34. The shaft 33 is tapered as shown, and the weight 35 has a tapered bore which fits the shaft 33. The weight 35 is circular, and is mounted coaxial with shaft 33. The nut 36 holds the weight 35 secured to the shaft 33 for rotation therewith, and the weight 35 is thus positioned along the shaft a predetermined distance away from the specimen 30.

When the base 15 is tilted by the handle 20 being rotated, for example, from the vertical position of Fig. 1 to the inclined position of Fig. 2, the axis of the spindle, 22, and the common axis of spindle 22, shaft 33 and specimen 30, is also inclined. The weight 35 thus comprises a cantilever load that tends to deflect the common axis of spindle 22, shaft 33 and specimen 30 away from the angle of inclination determined by the angle of adjustment of platen 15. The spindle 22, as also the shaft 33, are each constructed stronger than specimen 30 so that they do not bend appreciably under the load of weight 35. The cylindrical specimen 30 is small enough to bend under the load of weight 35, and bending along the continuous axis of spindle 22, specimen 30 and shaft 33 is confined virtually entirely within the cylindrical length of specimen 30. The shaft 33 is tapered as shown to dimensions which diminish along the shaft progressively away from its point of suspension, this being in accordance with established principles of cantilever construction. For the practical purpose of tests made by the machine of the disclosure, the total deflection of the common axis of spindle 22, specimen 30 and shaft 33 is concentrated in the specimen, and the specimen 30 is bent to curved condition under the load of the weight 35.

Figs. 7 and 8 serve to illustrate schematically the deflection by the weight 35, the illustration being exaggerated to demonstrate the principles more clearly. It will be noted that, because the specimen 30 has become bent under the deadweight load of weight 35, the tip 40 of shaft 33 has become displaced downwardly from the axis of spindle 22 extended. Viewed lengthwise, the axis of spindle 22 is at $a$ in Fig. 8, and tip 40 occupies the position $a$ when the base 15 is in vertical position of Fig. 1. By the base 15 being inclined to the position of Fig. 2 or the position of Fig. 7, the point 40 has become depressed away from the spindle axis at $a$ to position $b$ along the ordinate $a$—$b$ which coincides with the vertical plane described by the curved axis of specimen 30. The distance $a$—$b$ that the point 40 is depressed depends upon the horizontal moment arm of weight 35, i. e., the horizontal distance between the center of gravity of weight 35 and the lengthwise center of the cylinder of specimen 30.

The shaft 33 at its end 41, Figs. 1 and 2, is formed tubular as illustrated in detail in Figs. 5 and 6. Each of the set screws 42 is threaded radially through the wall of the tubular end 41, and they are disposed in coaxial sets that are diametrically opposite each other and thus serve to clamp the tip or target 40 in position along the geometric axis of the shaft 33.

The microscope 44 is supported on the base 15 by means of the mount 45, which comprises the carriage 46 on which the pillar 47 is secured to project away from the base 15. The microscope 44 is attached to the pillar 47 in any suitable manner for traverse lengthwise thereof by rotation of the handle or handwheel 48, the scale 49 being included to indicate the distance of traverse. Handwheel 50 is rotatable to traverse the carriage 46 in a direction at right angles to the axis of traverse 48, and a scale is provided for the traverse 50 that indicates the distance of its travel. Traverse by handle 48 is in the direction of an ordinate, and the traverse of handle 50, which is perpendicular to the traverse of handle 48, is along an abscissa.

The microscope 44 and its mount may be individually old in prior art instruments of various kinds, and requires no detailed disclosure herein. It is sufficient to know that the microscope 44 is supported by the pillar 47 for viewing through the eye-piece 51 in the direction of the axis of spindle 22 or in a line that is parallel thereto. The microscope 44 includes the knob 52 to focus the lenses of the microscope, and the knob 53 to focus the microscope to the object, these adjustments being commonly present in microscope structures.

The microscope 44 is sighted on the target 40. When the base 15 is tilted by adjustment of the handwheel 26, the target 40 will move under the load of the weight 35 along a line that constitutes an ordinate, for example from position $a$ to position $b$ in Fig. 8. This movement may be measured by the microscope 44 being traversed by rotation of handle 48 to track the target 40, and the scale 49 is read to determine the magnitude of displacement of target 40 under dead-weight load of the weight 35.

When the motor 25 is operated to drive the spindle 22, this rotation produces additional deflection of the target 40 laterally, lateral deflection being to the left, for example to position $c$ in Fig. 8, when the spindle 22 is rotated clockwise, and lateral deflection being to the right when spindle 22 is rotated counter-clockwise, to position $d$ for example. The microscope 44 is moved to the left or right by the traverse 50 to track the target laterally, and a suitable scale determines the distance of lateral displacement.

While the motor 25 drives the spindle 22, the target 40 remains stationary in a predetermined position away from the point $a$ in Fig. 8, at point $d$ for example, the magnitude of displacement of target 40 for a specimen of given material being determined by the angle of inclination of the base 15, and by the speed of rotation of the spindle 22 which may be determined by any suitable tachometer. This operation subjects the specimen 30 to successive bends, the magnitude of bends being proportionate to the diameter of radius $a-d$, Fig. 8. The specimen 30 will be bent successively circumferentially on all of its radii, and this continues repeatedly in the direction reverse of rotation at the rate determined by the R. P. M. of the spindle 22.

The shaft 33 projects through the aperture 55 of the bracket 56 which is supported on the base 15 as illustrated in Figs. 1 and 2. The push-button 57 is mounted at the base of the aperture 55 in the path of the shaft 33 under load of the weight 35, and the micro-switch 58 is operated when push-button 57 is depressed to thereby stop motor 25 by any suitable electrical connection therewith. The usual practice is to continue a test of a particular material of specimen 30 until failure. When the material fails, and rupture takes place, the weight 35 falls, and the shaft 33 falls with it and strikes the push-button 57 to stop motor 25. The motor 25 is thus automatically stopped by failure of specimen 30, and the amount of flexural stress that produced failure of the specimen is determined by reading the revolution counter 27.

There is a tendency of the target 40 to vibrate at its stationary position $c$ or $d$, Fig. 8, during a test run. The center of mass of circular weight 35 is coincident with the center of shaft 33, but this is only theoretically so. There is sufficient deviations from precise homogeneity of the material of weight 35, and perhaps slight deviation from accurate machining of parts, which throws the rotating mass off center sufficiently to cause the target 40 to vibrate as it is observed through microscope 44. A novel damping device 60, Figs. 1 and 2, and illustrated in detail in Figs. 3 and 4, operates to hold the target steady and to eliminate its vibration, and the target 40 is thereby held stationary to enable its position to be read easily and accurately by means of the microscope 44.

The damping device 60 comprises a stationary member 61 in the form of a disc with a concentric hole 62, the hole being large enough to contain the end 41 of shaft 33 without touching for any position of displacement of target 40. For holding the stationary member 61 suspended in fixed position in space, the bar 63 is secured thereto and includes the clamp 64 by means of which the disc is attached to the post 65, which projects away from 15 and is secured thereto along its edge at 66. The position of the stationary member 61 with reference to the shaft-end 41 is adjustable by means of the clamp 64, the adjustment serving to locate the end 41 of shaft 33 within the hole 62 at or near the center thereof when the platen 15 is in vertical position of Fig. 1.

The floating sheath 67, also in the form of a disc, is larger than the hole 62 and comprises the concentric bushing 68. The end 41 of shaft 33 is cylindrical and constitutes a bearing for which the bushing 68 is a journal. The bore 69 of bushing 68 is formed arcuate in the lengthwise direction to adjust itself to the bearing 41 when the axis of shaft 33 is tilted out of coaxial alignment with spindle 22 under load of the weight 35. The disc 67 rests on the disc 61, with the flat bottom surface of disc 67 bearing against the flat top surface of disc 61 in frictional engagement therewith.

A film of oil is provided between the opposed surfaces of the discs 67 and 61 for uniform and smooth frictional drag to steady the position of the target 40. The oil film between the discs 67 and 61 provides lubrication which reduces the frictional error of the vibration damping device 60 negligibly low. Several circular concentric grooves 70, and the radial groove 71 that connects the circular grooves, are filled with lubricating oil, and provide a sufficient supply of oil to maintain friction values constant during a test.

The hereinbefore presented description of the machine structure and its operation enables persons skilled in the art to understand the usefulness of the apparatus for determining fatigue properties of materials, damping capacity and dynamic modulus of elasticity without the need of further elaboration.

The machine shown in the drawing is one practical embodiment of the invention, which is not limited to the disclosed structure. The scope of the invention is determined by the accompanying claims.

I claim:

1. In a machine for testing materials, a spindle attached to one end of a specimen of the material coaxially with its longitudinal axis, mechanism to bend the specimen and displace the other end of the specimen out of coaxial alignment with the spindle and comprising a shaft projecting coaxially of the specimen from the end of the specimen remote from the spindle, a weight of predetermined mass carried by the shaft a predetermined distance along the shaft away from its attachment to the specimen, the center of mass of the weight being coincident with the axis of the shaft, a motor to drive the spindle and rotate the specimen on its longitudinal axis, and apparatus to measure displacement out of coaxial alignment with the spindle of the end of the specimen remote from the spindle.

2. In a machine as defined in claim 1, the weight being circular and rigidly secured to the shaft concentrically therewith.

3. In a machine as defined in claim 1, the apparatus for measuring displacement of the end of the specimen remote from the spindle comprising a microscope, and a mount for the microscope holding it for viewing in the direction of the axis of the spindle towards the displaced end of the shaft.

4. In a machine as defined in claim 3, the microscope mount comprising a traverse mechanism for each of two dimension displacement of the microscope and a scale for each traverse mechanism to indicate corresponding linear displacement of the microscope, one traverse mechanism paralleling the ordinate corresponding with displacement of the shaft by dead-weight load of the weight, and the other traverse mechanism paralleling an abscissa corresponding with lateral displacement of the shaft by rotation of the spindle.

5. In a machine as defined in claim 4, a target at the end of the shaft concentrically therewith, and an adjustment for concentricity of the target.

6. In a machine as defined in claim 4, a device for damping vibration of the free end of the shaft remote from the specimen.

7. In a machine as defined in claim 6, the vibration damping device comprising a bearing near the free end of the shaft, the bearing comprising a stationary member with a top surface that is flat, a sheath comprising a journal for the bearing, the sheath resting on the stationary member and comprising a flat bottom surface bearing against the flat top surface of the stationary member in frictional engagement therewith.

8. In a machine as defined in claim 7, the stationary member comprising a plate with a hole positioned around the bearing of the shaft out of contact therewith, the plate comprising a flat top surface, the sheath comprising a disc supporting the journal concentrically, the disc being larger than the hole of the plate and resting loosely on the plate, and the disc of the sheath comprising a flat bottom surface bearing on the flat surface of the plate in frictional engagement therewith.

9. In a machine as defined in claim 8, an adjustment for the stationary member to locate the journal in accordance with the position of the free end of the shaft when the machine is operating or not operating.

10. In a machine as defined in claim 8, grooves in the top surface of the plate to contain a fluid lubricant.

11. In a machine as defined in claim 10, the grooves including a plurality of circular grooves concentric with the hole of the plate and with each other and a radial groove connecting the circular grooves.

12. In a machine as defined in claim 1, a mount for the spindle comprising adjusting mechanism to vary the angle of inclination of the spindle with reference to the horizontal.

13. In a machine for testing materials, a base, a platen carried by the base and comprising a horizontal pivot to swing the platen on the base, adjusting mechanism to vary the inclination of the platen to various angles between vertical and horizontal, a spindle supported by the platen to rotate on an angle parallel therewith, an attachment at one end of the spindle to engage a specimen of the material at its one end and hold the specimen coaxially with the spindle, a motor to drive the spindle and rotate the specimen on its longitudinal axis, mechanism comprising a rigid shaft secured to the end of the specimen remote from the spindle coaxially of the specimen, the end of the shaft remote from the specimen being free and comprising a concentric weight carried by the shaft, and apparatus for measuring displacement of the free end of the shaft when the specimen is bent by the platen being adjusted to a position that is inclined out of vertical position.

14. In a machine as defined in claim 13, the apparatus for measuring displacement comprising a microscope, and a mount for supporting the microscope on the platen in position for viewing the displaced end of the shaft in the direction of the axis of the spindle.

15. In a machine as defined in claim 13, the adjusting mechanism for the platen comprising a brace for the platen connected pivotally at its respective opposite ends to the base and to the platen, the pivotal connection between the brace and the platen comprising a nut, the platen comprising a traverse screw threaded through the nut and directed lengthwise of the platen, and a handle to rotate the traverse screw to vary the angle of inclination of the platen with reference to the horizontal.

References Cited in the file of this patent

UNITED STATES PATENTS

| Number | Name | Date |
|---|---|---|
| 1,193,686 | Heisler | Aug. 8, 1916 |
| 1,507,412 | Bryson | Sept. 2, 1924 |
| 1,667,401 | Stockmeyer | Apr. 24, 1928 |
| 2,170,640 | Kenyon | Aug. 22, 1939 |
| 2,235,622 | Ray | Mar. 18, 1941 |
| 2,435,772 | Clarke | Feb. 10, 1948 |
| 2,436,096 | Chubb | Feb. 17, 1948 |
| 2,466,327 | Rieber | Apr. 5, 1949 |
| 2,514,140 | O'Connor | July 4, 1950 |
| 2,614,415 | Kepes | Oct. 21, 1952 |

FOREIGN PATENTS

| Number | Country | Date |
|---|---|---|
| 721,553 | France | Dec. 22, 1931 |
| 530,418 | Great Britain | Dec. 11, 1940 |
| 598,510 | Great Britain | Feb. 19, 1948 |